US008862437B1

(12) United States Patent
Rassaian et al.

(10) Patent No.: US 8,862,437 B1
(45) Date of Patent: Oct. 14, 2014

(54) MULTI-SCALE MODELING OF COMPOSITE STRUCTURES

(75) Inventors: Mostafa Rassaian, Bellevue, WA (US); Jonathan Henry Gosse, Issaquah, WA (US); Stephen Christensen, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 12/749,594

(22) Filed: Mar. 30, 2010

(51) Int. Cl.
*G06F 17/50* (2006.01)
*G06G 7/48* (2006.01)

(52) U.S. Cl.
USPC .................................................. 703/1; 703/6

(58) Field of Classification Search
USPC ............................................................. 703/6
See application file for complete search history.

(56) References Cited

U.S. PATENT DOCUMENTS

| 7,010,472 | B1 * | 3/2006 | Vasey-Glandon et al. | ........ | 703/6 |
| 7,561,995 | B2 | 7/2009 | Willis et al. | | |
| 2006/0282240 | A1 * | 12/2006 | Willis et al. | ........ | 703/2 |
| 2010/0121625 | A1 * | 5/2010 | Krog | ........ | 703/6 |
| 2010/0299108 | A1 * | 11/2010 | Glaser et al. | ........ | 703/1 |

OTHER PUBLICATIONS

Haghshenas et al. "Integrating the Simulation of Flow and Stress Development During Processing of Thermoset Matrix Composites", Jul. 2009, 17th International Conference on Composite Materials, 10 pages.*
Camanho et al., "Numerical Simulation of Mixed-mode Progressive Delamination in Composite Materials", 2003, Journal of Composite Materials, vol. 37, No. 16, pp. 1415-1438.*
Krueger et al. "From Simulation based design towards virtual certification for aircraft systems", Oct. 17-19, 2007, VIVACE Forum 3, 38 pages.*
Mariappan et al. "Simulation and Experimental Validation of Automotive Components", Feb. 9-12, 2009, Proceedings of the IMAC-XXVII, 10 pages.*
Stockwell, A. "Simulation of an Impact Test of the All-Composite Lear Fan Aircraft", 2001, 10 pages.*

(Continued)

*Primary Examiner* — Suzanne Lo
(74) *Attorney, Agent, or Firm* — Yee & Associates, P.C.

(57) ABSTRACT

A method, apparatus, and computer program product are present for creating a composite structure. A number of characteristics for a number of components for the composite structure is obtained from a simulation of the composite structure using a model of the composite structure. A number of changes in the number of characteristics needed to meet a desired level of performance for the number of characteristics is ascertained. A number of attributes for a number of composite materials used to form the number of components corresponding to the number of characteristics having the number of changes is identified. The number of attributes for the number of composite materials for the number of characteristics having the number of changes based on the desired level of performance is changed.

4 Claims, 8 Drawing Sheets

(56) References Cited

OTHER PUBLICATIONS

Naik et al. "Design optimization of composites using genetic algorithms and failure mechanism based failure criterion", Composite Structures 83, 2008, p. 354-367.*

Chang et al. "Optimal Design of the Cure Cycle for Consolidation of Thick Composite Laminates", Oct. 1996, Polymer Composites, vol. 17, No. 5, pp. 743-750.*

Buchanan et al., "Micromechanical enhancement of the macroscopic strain state for advanced composite materials", Composites Science and technology 69 (2009) pp. 1974-1978.

Gosse, H.H. and Christensen, S. "Strain Invariant Failure Criteria for Polymers in Composite Materials" AIAA-2001-1184, Apr. 2001, 11 pages.

Pipes, R.B. and Gosse, J.H. "An Onset Theory for Irreversible Deformation in Composite Materials" Paper presented at ICCM-17, the 17th International Conference on Composite Materials, Edinburgh, UK, Jul. 27-31, 2009, 10 pages.

Tsai, H., Alper, J. and Barrett D., "Failure Analysis of Composite Bonded Joints", Naval Air System Command, Structures Division (Code 4.3.3.1), Patuxent River, MD, AIAA-2000-1428, Mar. 1999, 10 pages.

* cited by examiner

MULTI-SCALE MODELING OF COMPOSITE STRUCTURES

BACKGROUND INFORMATION

1. Field

The present disclosure relates generally to composite structures and, in particular, to a method and apparatus for modeling composite structures at different structural levels.

2. Background

Composite materials are being used more and more often in various structures for platforms. For example, aircraft are being designed and manufactured with greater and greater percentages of composite materials. Some aircraft may have more than 50 percent of their primary structure made from composite materials.

Composite materials are often used in platforms, such as aircraft, to decrease the weight of the platform. This decreased weight may improve payload capacities and fuel efficiencies. Further, the use of composite structures may provide for longer service life for various components in an aircraft.

The composite materials used in composite structures may be created by combining two or more dissimilar components. For example, a composite material used in a composite structure may include fibers and resins. The fibers may be part of the tape, and the resins may be impregnated in the tape. The fibers and resins may be combined and cured to form the composite structure.

When designing composite structures, testing is often performed on these structures. Lab testing often is time consuming, expensive, inflexible, and includes unknown factors. With these problems and costs, only limited testing is currently performed on composite structures. As a result, structural designs may not be fully optimized, because there is presently no way to fully explore the different ways in which a composite structure can be constructed.

For example, a composite structure may be tested with a number of different types of fibers and resins using a number of different types of layup angles and layers. Each configuration of resins, fibers, layup angles, and number of plies requires time and expense for testing. As a result, as the number of configurations increase, the amount of time and expense needed to test configurations for composite structures increases.

Therefore, it would be advantageous to have a method and apparatus which takes into account one or more of the issues discussed above, as well as possibly other issues.

SUMMARY

In one advantageous embodiment, a method is present for creating a composite structure. A number of characteristics for a number of components for the composite structure is obtained from a simulation of the composite structure using a model of the composite structure. A number of changes in the number of characteristics needed to meet a desired level of performance for the number of characteristics is ascertained. A number of attributes for a number of composite materials used to form the number of components corresponding to the number of characteristics having the number of changes is identified. The number of attributes for the number of composite materials for the number of characteristics having the number of changes based on the desired level of performance is changed.

In another advantageous embodiment, an apparatus comprises a bus, a memory containing program code, and a processor unit configured to run the program code. The program code is run to obtain a number of characteristics for a number of components for a composite structure from a simulation of the composite structure using a model of the composite structure, ascertain a number of changes in the number of characteristics needed to meet a desired level of performance for the number of characteristics, identify a number of attributes for a number of composite materials used to form the number of components corresponding to the number of characteristics having the number of changes, and change the number of attributes for the number of composite materials for the number of characteristics having the number of changes based on the desired level of performance.

In yet another advantageous embodiment, a computer program product for creating a composite structure comprises a computer recordable storage medium and program code stored on the computer recordable storage medium. Program code is present for obtaining a number of characteristics for a number of components for the composite structure from a simulation of the composite structure using a model of the composite structure. Program code is present for ascertaining a number of changes in the number of characteristics needed to meet a desired level of performance for the number of characteristics. Program code is present for identifying a number of attributes for a number of composite materials used to form the number of components corresponding to the number of characteristics having the number of changes. Program code is present for changing the number of attributes for the number of composite materials for the number of characteristics having the number of changes based on the desired level of performance.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
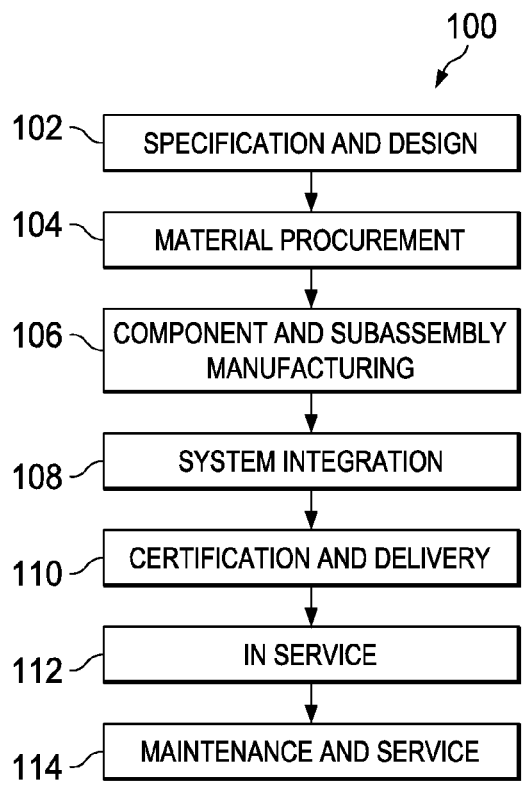
FIG. 1 is an illustration of an aircraft manufacturing and service method in accordance with an advantageous embodiment.
Figure 2:
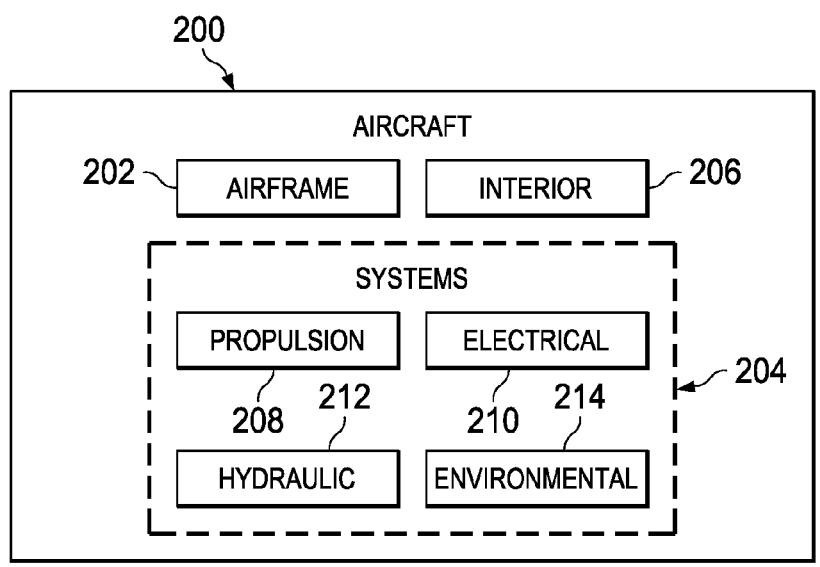
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, 10 of item C; four of item B, and seven of item C; and other suitable combinations.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that simulations of composite structures may be performed in conjunction with lab testing. For example, the different advantageous embodiments recognize and take into account that processes, such as finite element analysis programs, may be used to explore different configurations for composite structures. Based on the results of this type of testing, a subset of those configurations may be selected for actual physical testing. As a result, configurations that satisfy desired levels of performance for a structure may be selected for actual physical testing. As a result, the different advantageous embodiments recognize and take into account that this type of simulation, in conjunction with physical testing, may reduce the amount of time needed to certify an aircraft.

Even with these types of analyses, the different advantageous embodiments recognize and take into account that even with performing simulations for different configurations of materials for composite structures, the number of different variations that are present in configurations still may take more time and expense than desired in selecting composite materials for a composite structure, as well as testing the composite structure.

Thus, the different advantageous embodiments provide a method and apparatus for selecting the different configurations. For example, in some advantageous embodiments, a method and apparatus are present for creating a composite structure. A number of characteristics is obtained for the number of components for a composite structure from a simulation of the composite structure using a model. The model is for the composite structure.

A number of changes in the number of characteristics needed to meet a desired level of performance within the characteristics is ascertained. A number of attributes for the number of composite materials used to perform the number of components corresponding to the number of characteristics having a number of changes is identified. The number of attributes for the number of composite materials for the number of characteristics having a number of changes is changed based on the desired level of performance.

Figure 3:
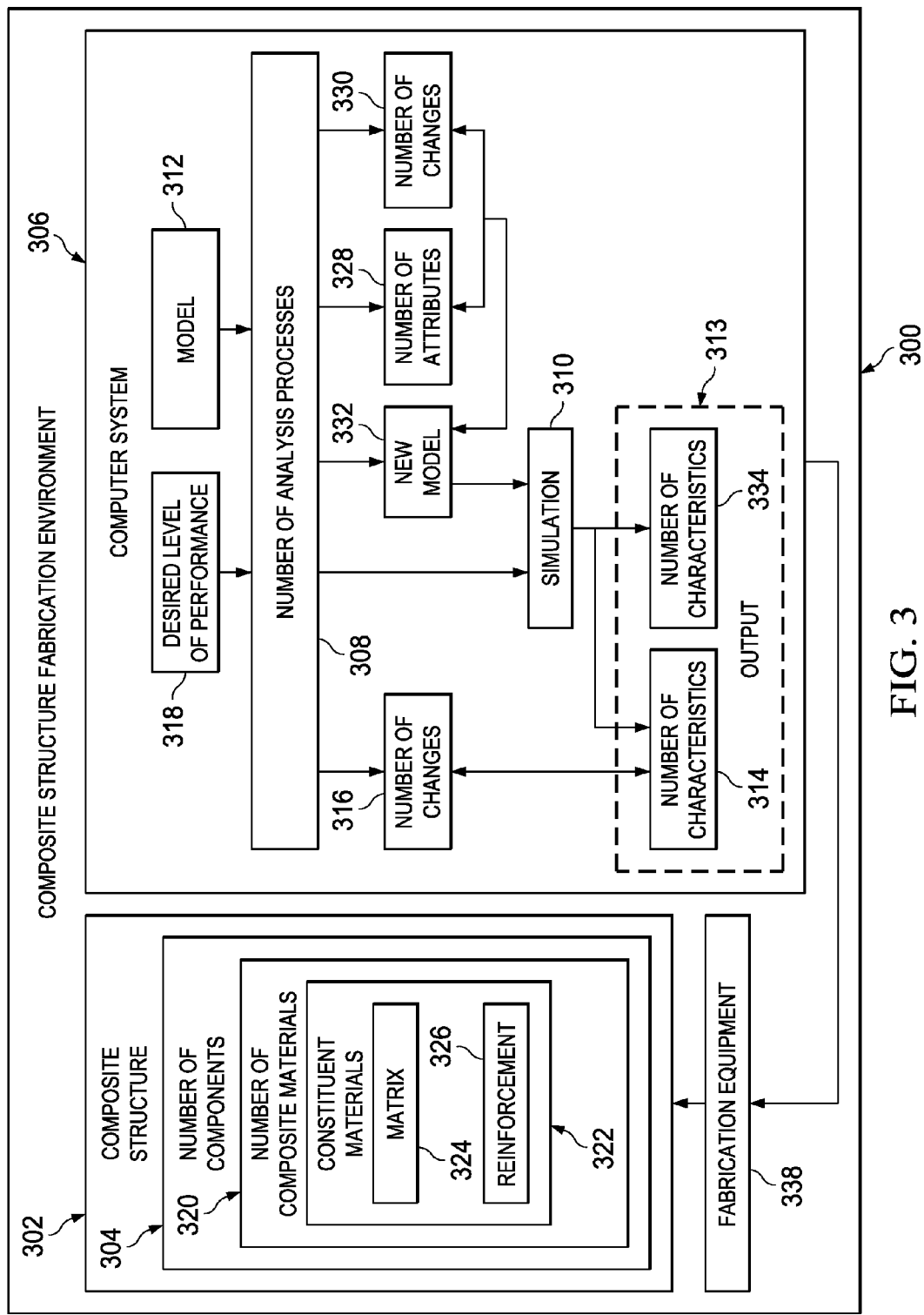
FIG. 3 is an illustration of a composite structure fabrication environment in accordance with an advantageous embodiment.

With reference now to FIG. 3, an illustration of a composite structure fabrication environment is depicted in accordance with an advantageous embodiment. In this illustrative example, composite structure fabrication environment 300 may be used to design composite structure 302.

Composite structure 302 may take a number of different forms. For example, without limitation, composite structure 302 may be a composite structure within aircraft 200 in FIG. 2. Composite structure 302 may be, for example, without limitation, a fuselage, a portion of a fuselage, an engine inlet, a wing, a stabilizer, a strut, a rib, a wing box, a fairing, and/or some other suitable type of structure.

In this illustrative example, composite structure 302 has number of components 304. Number of components 304 may include composite components and/or non-composite components. In other words, not all of the components in number of components 304 for composite structure 302 may be composite components.

Computer system 306 runs number of analysis processes 308. Number of analysis processes 308 may run on one or more computers within computer system 306. Further, number of analysis processes 308 may include a number of software modules or program code allowing the different processes within number of analysis processes 308 to exchange information.

Number of analysis processes 308 is used in this illustrative example to form simulation 310 for composite structure 302. Simulation 310 of composite structure 302 is performed using model 312 of composite structure 302. Number of analysis processes 308 may include, for example, without limitation, a finite element analysis process, and other suitable processes.

Simulation 310 of composite structure 302 generates output 313. Output 313 includes number of characteristics 314 for number of components 304 for composite structure 302. Number of characteristics 314 may include at least one of a force, a load, a displacement, an amount of strain, a temperature distribution, conductivity, absorbed energy, and other suitable characteristics. Number of changes 316 to number of characteristics 314 may be identified using desired level of performance 318.

Desired level of performance 318 may be a desired value for number of characteristics 314. For example, desired level of performance 318 may be a desired level for force or load on a portion or portions of composite structure 302. As another example, desired level of performance 318 may require that a selected load should occur through a particular component in number of components 304.

In these illustrative examples, number of composite materials 320 is present in number of components 304 for composite structure 302. In these illustrative examples, each composite material within number of composite materials 320 is formed from constituent materials 322. Constituent materials 322 take a number of different forms. The combination of two or more constituent materials in constituent materials 322 forms a composite material in number of composite materials 320 in these illustrative examples.

For example, constituent materials 322, in these examples, may be classified into two categories. For example, constituent materials 322 may be classified as matrix 324 or reinforcement 326. Matrix 324 is a material that supports and surrounds materials that are considered reinforcement 326. For example, reinforcement 326 may be fibers in a cloth, while matrix 324 may be a resin. The combination of matrix 324 with reinforcement 326 forms one or more composite materials in number of composite materials 320.

Number of composite materials 320, in these illustrative examples, has number of attributes 328. In these illustrative examples, number of attributes 328 may take a number of different forms. For example, without limitation, number of attributes 328 may be at least one of a value, a chemical formula, a layup angle, a width of a ply, a type of fiber, a type of resin, a type of cloth, a type of tape, a number of layers, a polymer, and other suitable attributes. Number of attributes 328 describes properties for constituent materials 322 for number of composite materials 320.

In these illustrative examples, number of analysis processes 308 identifies number of changes 330 to number of attributes 328. Attributes within number of attributes 328 are identified as ones in which changes to these attributes cause number of characteristics 314 to change.

In other words, number of analysis processes 308 may change number of attributes 328. In changing number of attributes 328, one or more of number of attributes 328 may be changed. In some cases, all of number of attributes 328 may be changed, and in other cases, only a portion of number of attributes 328 may be changed.

Number of changes 330 may be, for example, changing a chemical formula for the number of composite materials. Number of changes 330 also may be, for example, a change in orientation of at least one of a layup of the number of composite materials, a number of layers for the number of composite materials, a number of dimensions for tape in the number of composite materials, an amount of resin in the number of composite materials, a curing temperature in the number of composite materials, and other suitable attributes.

Number of changes 330 to number of attributes 328 is performed in a manner to increase the performance of number of characteristics 314 towards desired level of performance 318. In these examples, number of changes 330 to number of attributes 328 is made to model 312 such that new model 332 is formed.

In these illustrative examples, number of analysis processes 308 runs simulation 310 using new model 332. In these illustrative examples, simulation 310 may be performed for number of composite materials 320 in which number of changes 330 to number of attributes 328 has been made. This simulation may be run on these composite materials without simulating the entire composite structure. This simulation may be performed to determine whether number of changes 330 to number of attributes 328 is suitable for use in composite structure 302.

Number of analysis processes 308 runs simulation 310 using new model 332. Simulation 310 generates number of characteristics 334. Number of characteristics 334 is compared to number of characteristics 314 to determine whether number of characteristics 334 meets desired level of performance 318.

If desired level of performance 318 is met, then fabrication equipment 338 may be used to fabricate composite structure 302 for further testing. In other words, a composite structure is a physical object rather than a model or a virtual object. The testing of composite structure 302 may validate the results of simulation 310 in these illustrative examples.

The illustration of composite structure fabrication environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, more than one level of simulations and/or analysis may be performed. For example, a simulation of a platform, such as an aircraft, may be performed. Thereafter, an additional identification of a portion of the aircraft may be selected for analysis or further simulation. For example, stringers in a portion of a fuselage may be selected for the additional analysis or simulation. Characteristics for stringers in the fuselage may be identified from the simulation already performed or from additional simulations.

Based on these characteristics, number of composite materials 320 may be identified for the stringers and surrounding structures. The attributes that affect the characteristics for the constituent materials for the composite materials may then be identified. Changes to the attributes for the constituent materials may be identified. These attributes may be modified in a manner that increases the performance of the stringers to reach or meet a desired level of performance.

Figure 4:
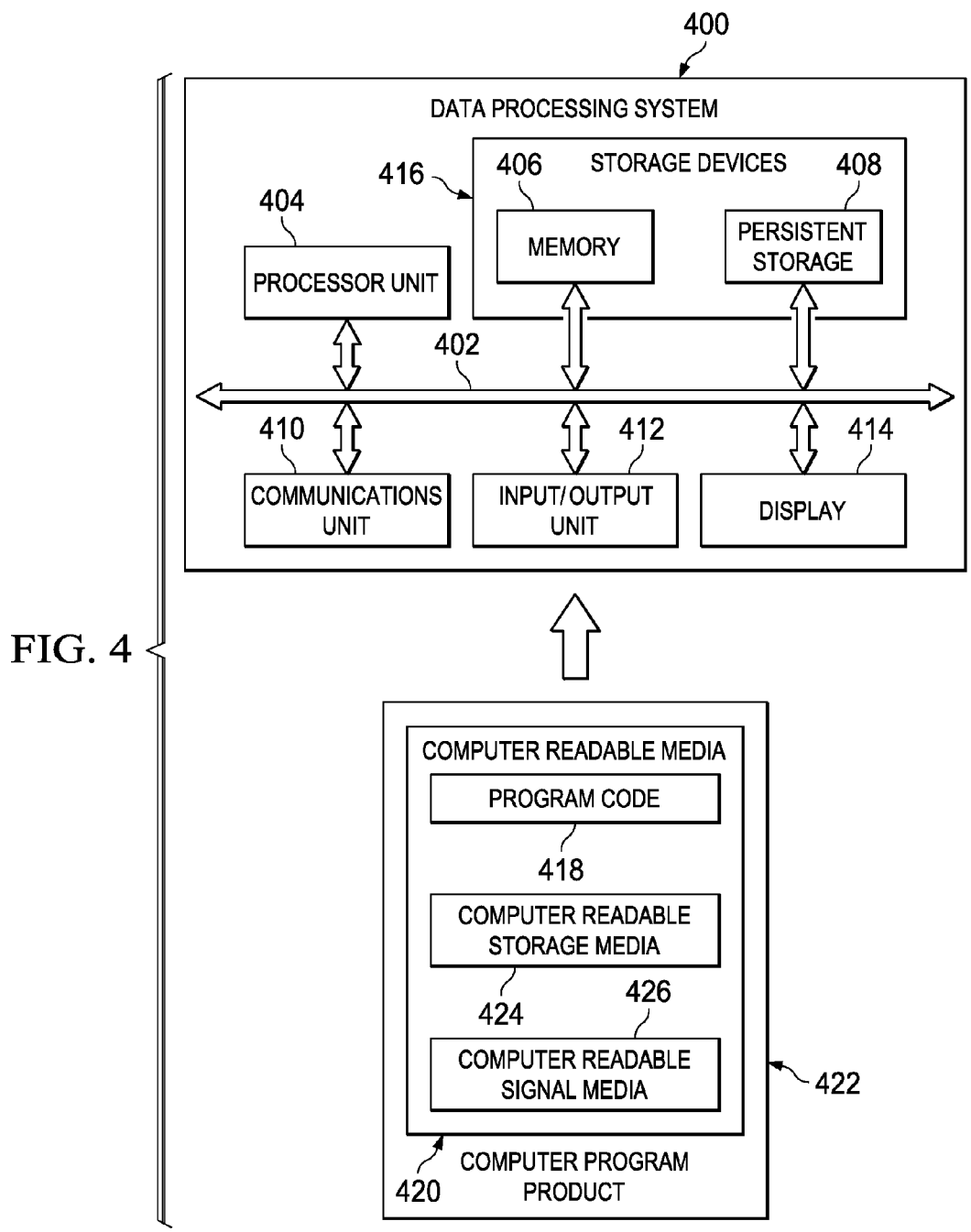
FIG. 4 is an illustration of a data processing system in accordance with an advantageous embodiment.

Turning now to FIG. 4, an illustration of a data processing system is depicted in accordance with an advantageous embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory or any other suitable volatile or non-volatile storage device.

Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406. For example, number of analysis processes 308 in FIG. 3 may be embodied in computer implemented instructions.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
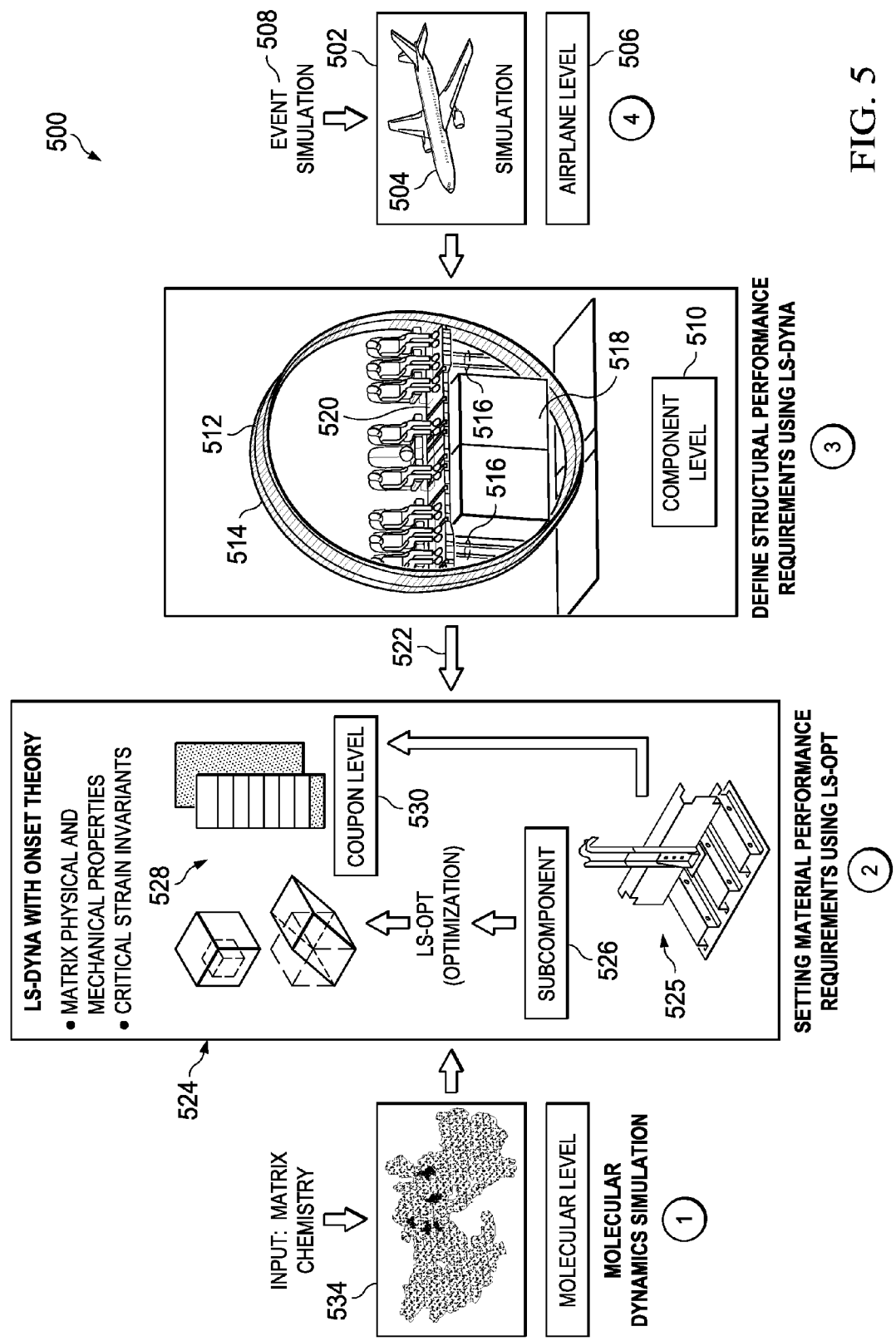
FIG. 5 is an illustration of a process for creating a composite structure in accordance with an advantageous embodiment.

With reference now to FIG. 5, an illustration of a process for creating a composite structure is depicted in accordance with an advantageous embodiment. In this illustrative example, process flow 500 is an example of operations that may be formed using number of analysis processes 308 in FIG. 3.

Process flow 500 may begin with simulation 502. Simulation 502 is for aircraft 504 and is an example of simulation 310 in FIG. 3 in these illustrative examples. Aircraft 504 is an example of composite structure 302.

In this depicted example, aircraft model 506 and event 508 are inputs for simulation 502. Event 508 may take a number of different forms. For example, without limitation, event 508 may be at least one of a bird strike, a force, or a particular portion of aircraft 504, an acceleration load, and other suitable types of events.

In the depicted examples, a particular portion of aircraft 504 may be selected for analysis. The simulation performed may be for all of aircraft 504. The analysis may be only on component level 510. In this example, component level 510 involves an analysis of section 512 of fuselage 514 for aircraft 504.

In some examples, simulation 502 is performed on component level 510 for aircraft 504. With this type of simulation, the simulation is for section 512 of fuselage 514 in aircraft 504.

In this example, section 512 of fuselage 514 includes columns 516, cargo section 518, and floor 520. Of particular interest are columns 516 in section 512 of fuselage 514. Of course, other components within section 512 may be of interest, depending on the particular implementation. A desired level of performance, such as desired level of performance 318 in FIG. 3, is defined for columns 516.

In these illustrative examples, simulation 502 is performed using a finite element analysis process. The finite element analysis process may be, for example, LS-DYNA®, available from Livermore Software Technology Corporation. Simulation 502 may be performed at any level of aircraft 504. For example, simulation 502 may be performed at the component level, the subcomponent level, the composite material level, the molecular level, and/or at other suitable levels.

Output 522 of simulation 502 is number of characteristics 524. Number of characteristics 524, in these examples, is for columns 516. Number of characteristics 524 may be compared to a desired level of performance for columns 516. Number of characteristics 524 is for columns 516 on subcomponent level 526. Subcomponent level 526 is, for example, number of composite materials 525 that forms columns 516.

Number of characteristics 524 for columns 516 may be used to identify number of attributes 528 on composite material level 530. In these examples, columns 516 may be examples of composite structure 302 in FIG. 3. In these examples, number of attributes 528 is in composite material level 530. In these illustrative examples, number of attributes 528 may include, for example, without limitation, a value, a chemical formula, a layup angle, a width of a ply, a type of fiber, a type of resin, a number of layers, a polymer, and/or other suitable types of attributes.

In this illustrative example, number of attributes 528 includes a chemical formula for number of composite materials 525 on composite material level 530. A number of changes may be made to the chemical formulas for number of composite materials 525.

Simulation 534 may be performed on a molecular level based on this number of changes to determine whether the number of changes to number of composite materials 525 is suitable for use in aircraft 504. Simulation 534 may include, for example, without limitation, a simulation of the deformation of fibers and matrix in response to different events. The manner in which the fibers and/or other components perform on a molecular level is used to indicate the performance of columns 516 and aircraft 504 using these materials.

If the changes to the chemical formula are suitable for use in meeting the desired level of performance for columns 516, then a simulation of aircraft 504 may be made with a new version of aircraft model 506. The new version of aircraft model 506 contains the changes in the chemical formula in this illustrative example.

Of course, in other illustrative examples, other types of changes may be made in addition to or in place of changes to the chemical formula. For example, instead of using different types of resin or fiber, the density of fibers, the orientation of plies, the orientation of fibers, the amount of resin used with the fibers, and other suitable factors also may be changed and simulated to determine whether those factors provide a desired level of performance for the aircraft.

In these illustrative examples, the desired level of performance may be a specific value or threshold. In other illustrative examples, the desired level of performance may be an increase in a characteristic rather than a particular value. For example, an increase in the time needed to deform a material may be considered reaching a desired level of performance. In other illustrative examples, the amount of time for deformation meets a desired level of performance when the time is equal to or greater than some specified value for the time.

Figure 6:
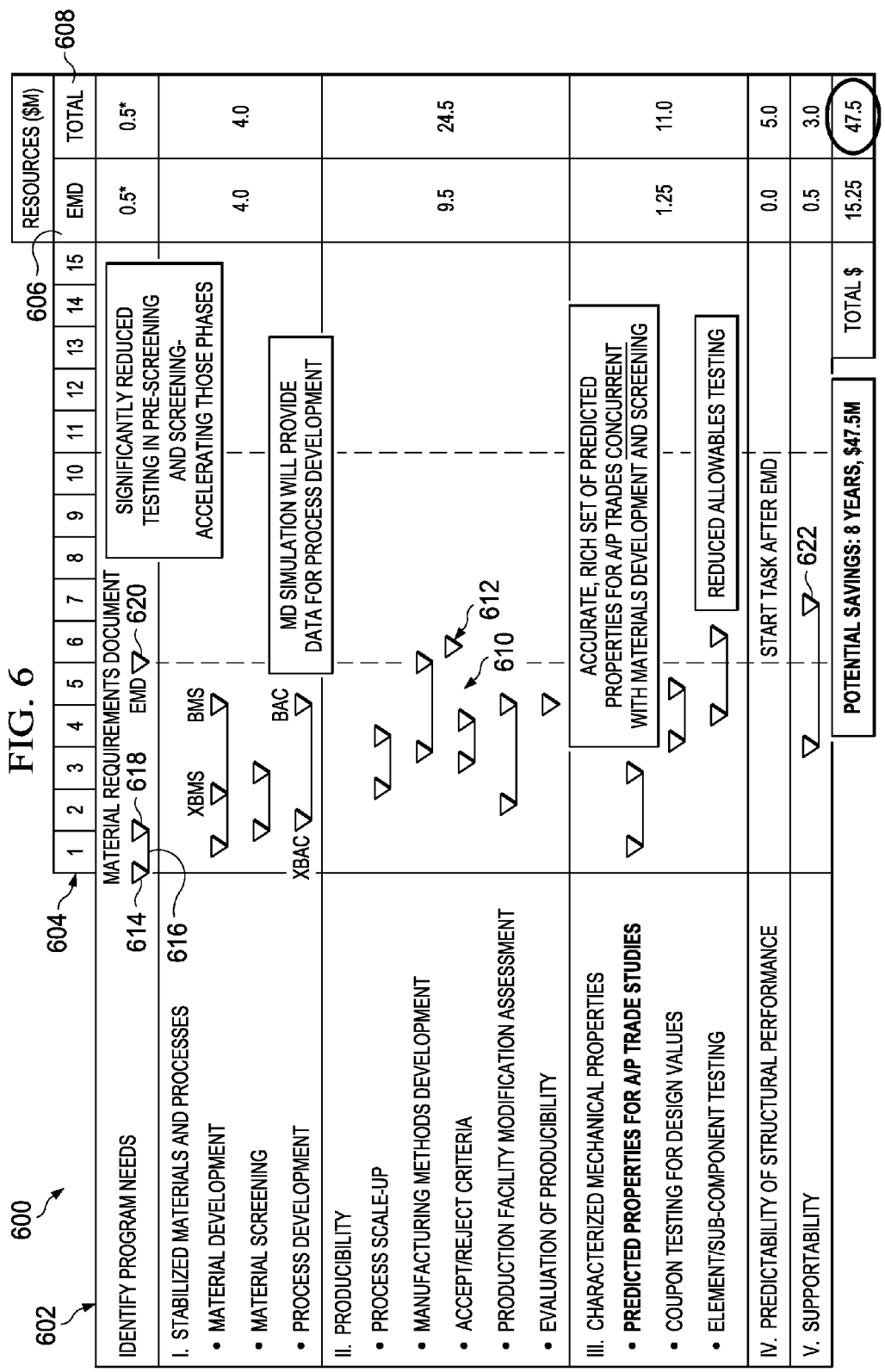
FIG. 6 is an illustration of a chart showing the development of materials for a composite structure in accordance with an advantageous embodiment.

With reference now to FIG. 6, an illustration of a chart showing the development of materials for a composite structure is depicted in accordance with an advantageous embodiment. In this illustrative example, chart 600 shows the time and cost needed to develop composite materials for use within composite structure fabrication environment 300 in FIG. 3. In particular, chart 600 shows the time and cost needed to develop the composite materials using number of analysis processes 308 in FIG. 3. The composite materials may be, for example, number of composite materials 320 in FIG. 3 and/or number of composite materials 525 in FIG. 5.

Chart 600 includes processes 602, time 604, end of material development cost 606, and total cost 608. Processes 602 include the different processes performed in developing and testing composite materials for a composite structure. Time 604 is a timeline in years for processes 602. End of material development cost 606 is the cost for developing the composite materials for a composite structure. Total cost 608 is the total cost for developing and testing the performance of the composite materials before use of the composite materials in the composite structure.

Lines 610 represents the time needed for the different processes. Markers 612 indicate different points in time in processes 602. For example, some of markers 612 indicate the beginning of a process in processes 602, while other markers in markers 612 indicate the end of a process in processes 602. As one illustrative example, marker 614 indicates the beginning of the development of the composite material.

Marker 614 also indicates the beginning of a process for identifying needs for a composite material. These needs may be the needs of an entity, such as, for example, a program, an organization, a company, or some other suitable entity. Line 616 represents the time needed to complete the process of identifying the needs for a composite material. In this example, about one year is needed for identifying these needs. Marker 618 indicates the end of this process at about one year.

In this illustrative example, marker 620 indicates the end of material development. As depicted, the end of material development, in this illustrative example, is about five years. Marker 622 indicates the end of development, testing, and supportability of the composite materials. As depicted, development and testing of the composite materials ends at about seven years.

In this illustrative example, the end of material development indicated by marker 620 is about five years less than the time need for the end of material development using currently existing state-of-the-art methods. Further, the end of development, testing, and supportability of the composite materials indicated by marker 622 is about eight years less than the time needed using currently existing state-of-the-art methods.

Further, in this illustrative example, the end of material development cost for all of processes 602 is about 15.25 million dollars. This cost is about 15.25 million dollars less than the cost using currently existing state-of-the-art methods. The total cost for processes 602 is about 47.5 million dollars. This cost is about 47.5 million dollars less than the cost using currently existing state-of-the-art methods.

The numbers for time and cost, in this example, are meant to be illustrative only and are for the development and testing of one type of material. Different time and expense savings may be achieved for different development processes and/or testing processes and for different materials.

Figures 7, 9:
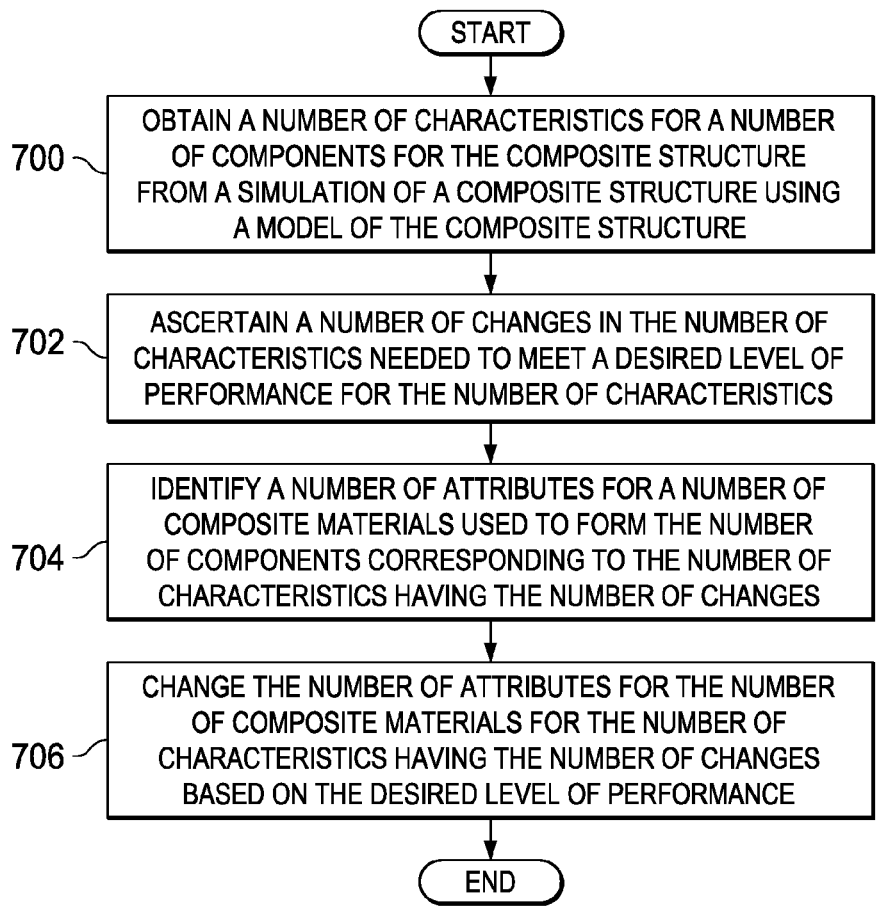
FIG. 7 is an illustration of a flowchart of a process for creating a composite structure in accordance with an advantageous embodiment.
FIG. 9 is an illustration of a table comparing simulation and experimental values in accordance with an advantageous embodiment.

With reference now to FIG. 7, an illustration of a flowchart of a process for creating a composite structure is depicted in accordance with an advantageous embodiment. The process illustrated in FIG. 7 may be implemented within composite structure fabrication environment 300 in FIG. 3. In particular, the process may be implemented using number of analysis processes 308 in FIG. 3.

The process begins by obtaining a number of characteristics for a number of components for the composite structure from a simulation of a composite structure using a model of the composite structure (operation 700). The simulation may be, for example, simulation 310 in FIG. 3 and/or simulation 502 in FIG. 5. The number of characteristics obtained may include at least one of a force, a load, a displacement, an amount of strain, a temperature distribution, conductivity, absorbed energy, and other suitable characteristics.

Thereafter, the process ascertains a number of changes in the number of characteristics needed to meet a desired level of performance for the number of characteristics (operation 702). The process identifies a number of attributes for a number of composite materials used to form the number of components corresponding to the number of characteristics having the number of changes (operation 704). The number of attributes identified may be at least one of a value, a chemical formula, a layup angle, a width of a ply, a type of fiber, a type of resin, a type of cloth, a type of tape, a number of layers, a polymer, and other suitable attributes.

Thereafter, the process changes the number of attributes for the number of composite materials for the number of characteristics having the number of changes based on the desired level of performance (operation 706), with the process terminating thereafter. In operation 706, the changes made to the number of attributes may be, for example, a change in orientation of at least one of a layup of the number of composite materials, a number of layers for the number of composite materials, a number of dimensions for tape in the number of composite materials, an amount of resin in the number of composite materials, a curing temperature in the number of composite materials, and other suitable attributes.

Figure 8:
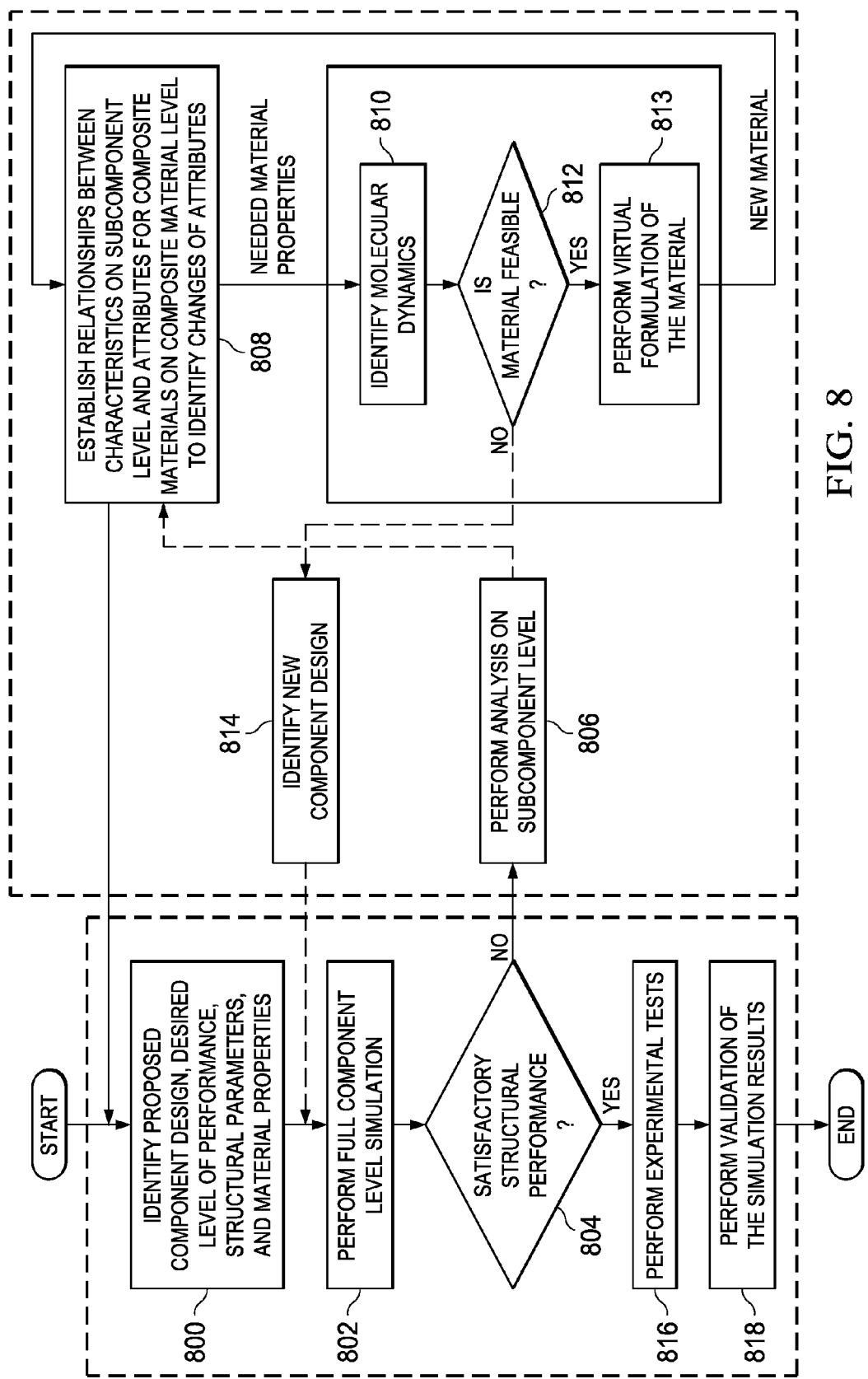
FIG. 8 is an illustration of a flowchart of a process for developing and testing a composite structure in accordance with an advantageous embodiment.

With reference now to FIG. 8, an illustration of a flowchart of a process for developing and testing a composite structure is depicted in accordance with an advantageous embodiment. The process illustrated in FIG. 8 is implemented within composite structure fabrication environment 300 in FIG. 3. The process is implemented using number of analysis processes 308 in FIG. 3.

The process begins by identifying a proposed design for a composite structure, a desired level of performance, structural parameters, and material properties (operation 800). In operation 800, the composite structure is composite structure 302 in FIG. 3. As another illustrative example, the composite structure may be aircraft 504 in FIG. 5.

The process performs a full component level simulation (operation 802). In this illustrative example, a full component level simulation means that the simulation is performed on the level of the composite structure. The simulation performed in operation 802 is simulation 310 in FIG. 3.

The process then determines whether the structural performance of the composite structure is satisfactory (operation 804). If the structural performance of the composite structure is not satisfactory, the process performs an analysis on the subcomponent level of the composite structure (operation 806). The analysis may be performed for, for example, columns 516 of fuselage 514 of aircraft 504 in FIG. 5.

In operation 806, the analysis is performed to identify a number of characteristics that affect the performance of the composite structure on the subcomponent level. A number of changes to the number of characteristics are also identified using the desired level of performance. Further, a range of values for the number of characteristics that may allow the composite structure to have the desired level of performance is identified.

In this illustrative example, the analysis in operation 806 may be performed using software, such as, for example, without limitation, LS-OPT®, available from Livermore Software Technology Corporation; LS-DYNA®, available from Livermore Software Technology Corporation; MAT-162, available from Material Science Corporation; and/or other suitable software applications.

In this depicted example, LS-DYNA® is a finite element analysis simulation program. LS-OPT® is an optimization program that may be used with simulation software, such as LS-DYNA®. LS-OPT® is used to identify the number of characteristics that may be changed to provide the desired level of performance for the composite structure. Further, MAT-162 uses the number of characteristics to identify the number of changes to the number of characteristics.

In these examples, MAT-162 is a composite material model that may be incorporated into the program code for LS-DYNA®. MAT-162 allows 39 characteristics to be analyzed under different test conditions.

Further, MAT-162 may be used for progressive modeling of changes to composite structures and/or materials. The progressive modeling may include, for example, simulating ballistic impact, inconsistencies, penetration, matrix cracks, delamination, fiber tension shear, fiber compression, fiber crush, and/or other undesired effects that may occur for a composite structure and/or material. In other illustrative examples, some other suitable material model may be used in LS-DYNA®.

The process then establishes a number of relationships between the number of characteristics on the subcomponent level and a number of attributes for a number of composite materials for the composite structure on a composite material level to identify a number of changes to the number of attributes (operation 808). In operation 808, relationships are established between the loading and deformations at a macroscopic level and the state of strain within the matrix and reinforcements at a microscopic level.

These relationships may be established using at least one of Onset Theory and Micro-Mechanical Enhancement (MME) in these illustrative examples. Onset Theory and Micro-Mechanical Enhancement techniques are used to analyze the attributes for the number of composite materials on the composite material level under the same testing conditions as used in operation 806. In particular, these testing conditions are the testing conditions used in the analysis performed using LS-OPT® and MAT-162. In operation 808, relationships between other levels may also be established using other techniques.

In these different examples, the composite material level may also be referred to as an intrinsic material level. The number of attributes for a composite material on the composite material level may include, for example, without limitation, dilatation, distortion, and/or other suitable attributes.

The analysis performed using Onset Theory and Micro-Mechanical Enhancement allows relationships between the number of characteristics and the number of attributes to be established. In other words, the number of changes to the number of attributes for the number of composite materials may affect the number of characteristics. The number of attributes and/or the number of characteristics may be changed to achieve the desired level of performance.

Thereafter, the process performs a molecular analysis for each of the number of composite materials needing the number of changes to the number of attributes for the number of composite materials. A molecular analysis is performed on the level of the atoms and chemical makeup for a material.

In this molecular analysis, the process identifies the molecular mechanisms and/or configurations for the number of composite materials that may make the number of changes to the number of attributes for the number of composite materials (operation 810). Molecular configurations are the chemical makeup of a material. In other words, molecular configurations may include chemical formulas for the material. Molecular mechanisms are the dynamic movements of the polymeric structure of the material in response to an applied load. The process then determines whether the number of composite materials having the molecular mechanisms and/or configurations is feasible (operation 812). In operation 812, this determination is made based on known relationships between the chemical structure of a material and the performance of a material when used in a larger component.

If the number of composite materials having the molecular mechanisms and/or configurations is feasible, the process then performs a virtual formulation of the material on the level of the constituent materials (operation 813). A virtual formulation is a construction of the material using simulation software run on a computer system. In other words, a virtual formulation does not include actually mixing the constituent materials for a material to form the material. The virtual formulation is a software-based representation of the material.

In operation 813, the virtual formulation of the material may be generated using molecular dynamics software, such as, for example, without limitation, Materials Studio®, available from Accelrys, Incorporated. In operation 813, the virtual formulation of the material is processed to identify mechanical and thermal properties for the material. In this illustrative example, the performance of operations 810, 812, and 813 form the molecular analysis for the number of composite materials.

Thereafter, the process returns to operation 808 as described above. In returning to operation 808, the mechanical and thermal properties identified from processing the virtual formulation of the material are used in performing operation 808. In this manner, relationships may be established between the number of characteristics on the subcomponent level and the number of attributes for the number of composite materials with the molecular mechanisms and/or configurations identified in operation 810.

With reference again to operation 808, when changes to the number of attributes for the number of composite materials to cause the number of changes to the number of characteristics have been made, the process returns to operation 800 as described above. In operation 800, the process uses the new material properties and structural parameters for the number of composite materials.

With reference again to operation 812, if the number of composite materials having the molecular mechanisms and/or configurations is not feasible, the process identifies a new component design for use in performing a full component level simulation (operation 814). In operation 814, the process may also generate an alert to a user performing the analysis that the molecular mechanisms and/or configurations identified cannot be used to actually make the composite material. Further, the alert may indicate that the desired level of performance may need to be achieved through changes to the design of the material and/or the component.

Changes to the design of the material may include, for example, a change to the layup of the plies of the material. A ply is a layer in the material. Changes to the layup of the plies may include, for example, without limitation, changes to the thickness, fiber orientation, stack-up of the plies, and/or other characteristics. If changes to the design of the material do not provide the desired level of performance, the component may be redesigned.

Thereafter, the process returns to operation 802 as described above. With reference again to operation 804, if the structural performance of the composite structure is satisfactory, the process performs experimental tests on the subcomponent level (operation 816). The process then performs a validation of the simulation results using the results of the experimental tests (operation 818), with the process terminating thereafter. In operation 818, the results of the experimental tests are used to validate the results of the simulation performed in operation 802.

With reference now to FIG. 9, an illustration of a table comparing simulation and experimental values is depicted in accordance with an advantageous embodiment. In this illustrative example, table 900 shows the simulation and experimental values for a number of attributes for a number of composite materials. Table 900 may be used to perform operation 818 in FIG. 8 to validate simulation results.

Table 900 includes composite materials 902, attributes 904, simulation 906, and experiment 908. Composite materials 902 are the materials for which attributes 904 are identified by both simulation and experiment. Composite materials 902 include resin 1 903, epoxy 905, and resin 2 907. In this example, epoxy 905 is a currently available state-of-the-art epoxy.

Further, resin 2 907 is a computationally-designed resin. A computationally-designed resin is a resin that is first virtually formed prior to performing physical mixing of the materials for the resin, curing, and testing.

Attributes 904 include dilatation and distortion characteristics for composite materials 902. Dilatation and distortion are represented by J and $\epsilon_{VM}$, respectively. Dilatation, J, is a change in the volume of a material. Distortion, $\epsilon_{VM}$, is a change in the shape of a material.

Simulation 906 includes the values for attributes 904 identified by running a simulation, such as simulation 310 in FIG. 3. This simulation may be run by, for example, number of analysis processes 308 in FIG. 3.

Experiment 908 includes the values for attributes 904 identified by running experiments on composite materials 902. These experiments may be run on composite materials 902 to validate that the values for attributes 904 identified by running the simulation are near to or substantially the same as the actual values for attributes 904.

Figure 10:
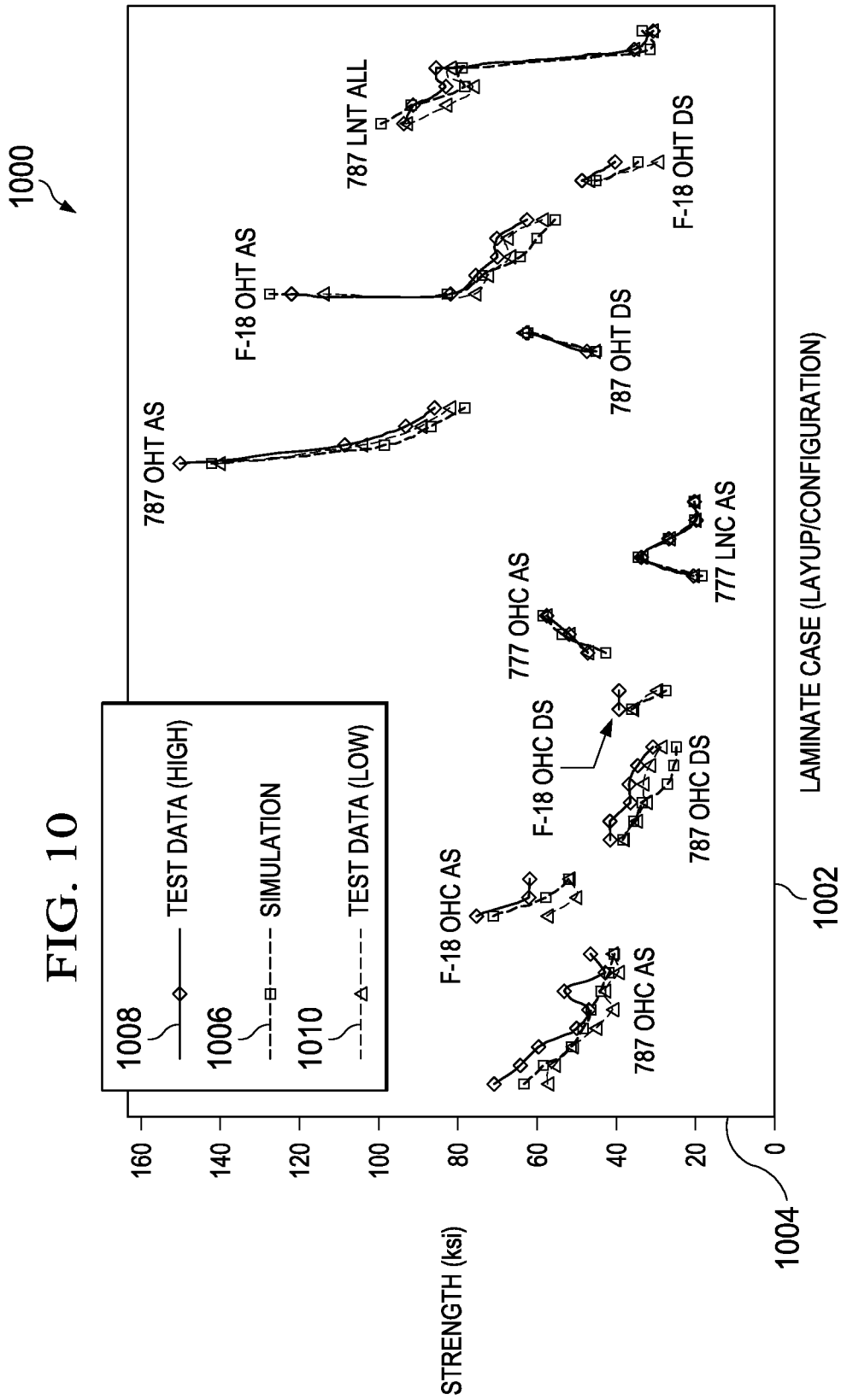
FIG. 10 is an illustration of a graph showing simulation results in accordance with an advantageous embodiment.

With reference now to FIG. 10, an illustration of a graph showing simulation results is depicted in accordance with an advantageous embodiment. In this illustrative example, graph 1000 shows simulation results for a number of different layup configurations for a composite material. The simulation results depicted in graph 1000 may be the results of a simulation, such as simulation 310 in FIG. 3.

Graph 1000 has horizontal axis 1002 and vertical axis 1004. Horizontal axis 1002 is for different layup configurations for a material. Vertical axis 1004 is the strength of the material with the different layup configurations. The strength of the material is analyzed for one of tension and compression. In these examples, the measurement of strength is in the units of kilo-pounds per square inch (ksi).

Lines 1006 in graph 1000 are results of simulations analyzing tension for open hole layup configurations, compression for open hole layup configurations, tension for large notch layup configurations, and compression for large notch layup configurations.

Lines 1008 in graph 1000 are the upper limits of test data for the different layup configurations. The test data are the results of actual experimental testing of the strength of the material with the different layup configurations. Lines 1010 in graph 1000 are the lower limits of the test data for the different layup configurations.

As depicted in graph 1000, the test data and the simulation results are similar. In this manner, the simulation results in lines 1006 may be validated using the test data. In particular, graph 1000 may be used to perform operation 818 in FIG. 8.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for creating a composite structure and reducing an amount of time to certify an aircraft manufactured with the composite structure, the method comprising:

a computer obtaining a number of characteristics for a number of components for the composite structure from a simulation of the composite structure using a model of the composite structure;

the computer ascertaining a number of changes in the number of characteristics needed to meet a desired level of performance for the number of characteristics;

the computer identifying a number of attributes for a number of composite materials used to form the number of components corresponding to the number of characteristics having the number of changes;

the computer changing the number of attributes for the number of composite materials for the number of characteristics having the number of changes based on the desired level of performance, wherein the computer changing the number of attributes further comprises:

the computer identifying the number of attributes in which changes to the number of attributes cause changes to the number of characteristics to increase a level of performance towards the desired level of performance;

the computer changing the number of attributes to cause the number of characteristics to increase a level of performance towards the desired level of performance; and the computer changing at least an amount of resin in the number of composite materials, the computer performing the simulation using the model of the composite structure;

the computer receiving first results from the simulation, wherein the first results include a first performance of the composite structure in the simulation;

the computer determining whether the first performance of the composite structure is acceptable;

the computer, responsive to a determination that the first performance of the composite structure is acceptable, selecting a physical object of the composite structure for physical testing;

the computer receiving second results from the physical testing, wherein the second results include a second performance of the physical object in the physical testing; and the computer comparing at least one first result from the first results and at least one second result from the second results to validate a composition of the composite structure, whereby the amount of time to certify the aircraft is reduced.

2. The method of claim 1, wherein the composite structure is selected from one of a fuselage, a portion of the fuselage, an engine inlet, a wing, a stabilizer, a strut, and a fairing.

3. An apparatus comprising:
a bus;
a memory containing program code;
and a processor unit configured to run the program code to:
obtain a number of characteristics for a number of components for a composite structure from a simulation of the composite structure using a model of the composite structure;

ascertain a number of changes in the number of characteristics needed to meet a desired level of performance for the number of characteristics identify a number of attributes for a number of composite materials used to form the number of components corresponding to the number of characteristics having the number of changes; and change the number of attributes for the number of composite materials for the number of characteristics having the number of changes based on the desired level of performance, the number of characteristics comprising at least an amount of resin in the number of composite materials;

perform the simulation using the model of the composite structure;

receive first results from the simulation, wherein the first results include a first performance of the composite structure in the simulation;

determine whether the first performance of the composite structure is acceptable; and select, responsive to a determination that the first performance of the composite structure is acceptable, a physical object of the composite structure for physical testing;

receive second results from the physical testing, wherein the second results include a second performance of the physical object in the physical testing; and comparing at least one first result from the first results to at least one second result from the second results to validate a composition of the composite structure, whereby the amount of time to certify the aircraft is reduced.

4. The apparatus of claim 3, wherein the composite structure is selected from one of a fuselage, a portion of the fuselage, an engine inlet, a wing, a stabilizer, a strut, and a fairing.

* * * * *